June 7, 1966 N. F. RAMSEY ETAL 3,255,423
ATOMIC HYDROGEN MASER
Filed Oct. 2, 1961
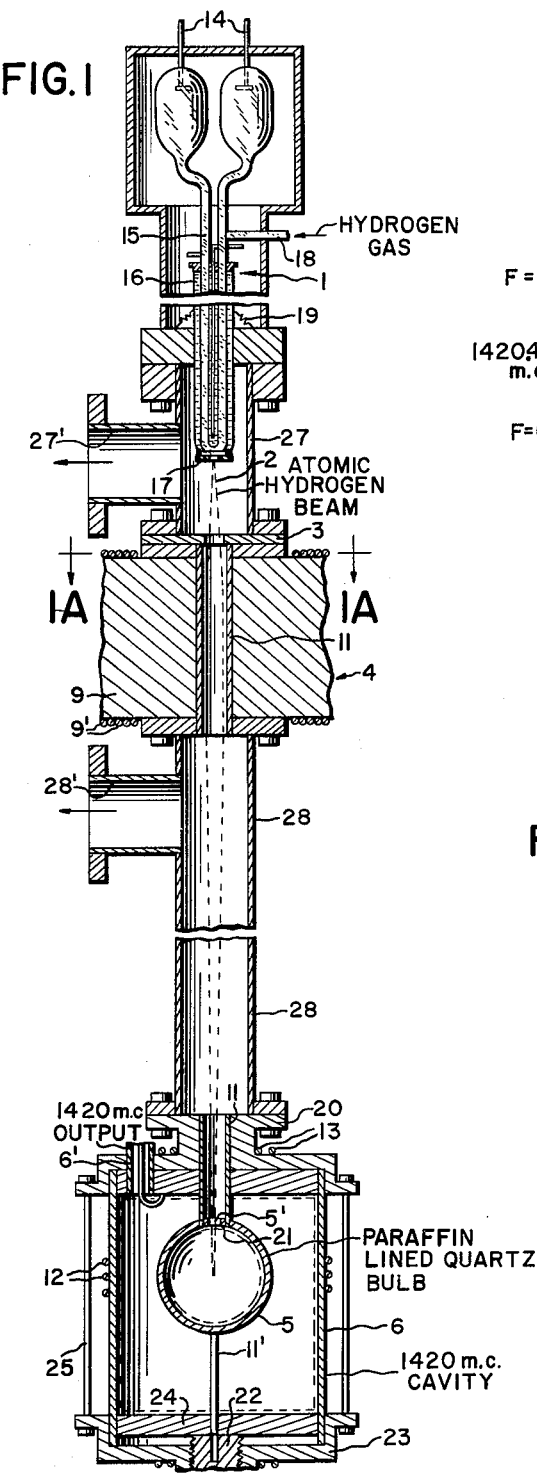
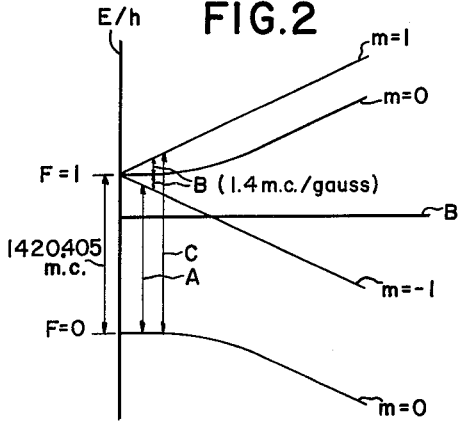
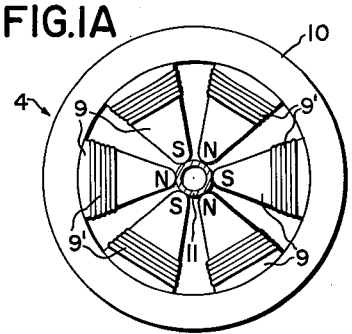
INVENTORS
NORMAN F. RAMSEY
DANIEL KLEPPNER
BY 
ATTORNEY

United States Patent Office 3,255,423
Patented June 7, 1966

3,255,423
ATOMIC HYDROGEN MASER
Norman F. Ramsey, 55 Scott Road, Belmont, Mass., and Daniel Kleppner, 9 Dana St., Cambridge, Mass.
Filed Oct. 2, 1961, Ser. No. 142,356
10 Claims. (Cl. 331—94)

The present invention relates to a device for generating microwave energy of unprecedented spectral purity, and thus of importance in such applications as frequency standardization and stabilization, magnetic field measurement and control, and radio frequency communication.

A previous device demonstrating maser action, that is microwave generation due to coherent radiation of quantum mechanical particles undergoing resonance transitions between discrete energy levels, is the ammonia maser which utilizes the electric dipole transition of ammonia molecules. This device has, however, been found subject to a number of limitations, including a resonance linewidth of several kc./sec., and a substantial pulling of the resonance frequency with slight detuning of the cavity resonator in which the radiation takes place.

To overcome these limitations of the ammonia maser, devices have been proposed which utilize magnetic dipole transitions of certain free atoms. Prior to the present invention, however, it has not been possible to obtain maser oscillation with such devices due to the weakness of their radiation matrix elements. The characteristic magnetic dipole matrix element for atoms is about 100 times smaller than the corresponding electric dipole matrix element of molecules, and the criteria for maser oscillation depend on the square of these matrix elements. To compensate for this, an extremely long time of interaction between the atoms and the field of the cavity is required.

Although the use of storage boxes with specially coated walls for preventing relaxation of certain atoms upon collision has previously been proposed as a mechanism for increasing the effective interaction time, this technique has not heretofore yielded results of any practical significance at the high hyperfine transition frequencies. For example, experiments utilizing cesium atoms demonstrate that with paraffin wall coatings a hyperfine magnetic resonance signal is too greatly perturbed for precision spectroscopy after only a limited number, on the order of 200, wall collisions.

Our experiments indicate that the dominant relaxation mechanism limiting the hyperfine interaction time in storage boxes is due to induced electrostatic forces as an atom approaches the wall surface. Such electrostatic interaction introduces a phase shift in the hyperfine state wave function of the atoms by spreading the electron cloud and diminishing the electron density at the nucleus, the phase shift being proportional to the adsorption time which in turn depends on the electrostatic interaction. Further, both the amount and dispersion of the phase shift, which cause a shift and broadening, respectively, of the hyperfine resonance line, significantly depend not only on the polarizability of the wall surface, but also on the polarizability of the colliding atoms.

Thus, we came to the realization that a significant increase in the effective hyperfine interaction could be achieved by utilizing hydrogen atoms, the polarizability of which is approximately 75 times smaller than that of cesium, for example. Furthermore, since many low polarizability wall coating compounds are also hydrogen-saturated or halogen-saturated, no chemical binding forces would be present to cause adsorption of colliding hydrogen atoms. Based on these realizations, we concluded that sufficiently long storage times for detection of atomic hydrogen resonance by maser oscillation was possible, thereby eliminating previous objections to the use of hydrogen, particularly in atomic beam experiments, including high atom velocities and the difficulties of direct detection.

These predictions have been experimentally verified by the observation of 1420.405 mc. hydrogen maser radiation with an interaction time approaching 1 second, corresponding to more than 10,000 wall collisions. The measured linewidth of the resonance (response to an external excitation) was only about 1 cps. The spectral linewidth for self-sustaining oscillatory operation is expected to be smaller by a factor on the order of $10^{-6}$. A preliminary report of this experiment appears in the Oct. 15, 1960 issue of Physical Review Letters, pp. 361–362.

It is the principal object of the present invention to obtain high resolution hyperfine magnetic resonance signals with atomic hydrogen.

One feature of the present invention is the provision of a hyperfine magnetic resonance device utilizing atomic hydrogen stored in a container which is lined with a hydrogen-saturated or halogen-saturated material, thereby effecting enhanced hyperfine interaction times.

Another feature of the present invention is the provision of a magnetic dipole maser utilizing hyperfine transitions of hydrogen atoms in a storage cell.

These and other features and advantages of the present invention will be more apparent after a perusal of the following specification taken in connection with the accompanying drawings wherein, FIG. 1 is a cross-sectional view of an atomic hydrogen maser according to the present invention, FIG. 1A is a cross-sectional view taken along line 1A in FIG. 1, and FIG. 2 is a plot of the variation in energy (E) of the various atomic hydrogen hyperfine states as a function of environment static magnetic field intensity B, the energy being expressed in frequency units by dividing by Planck's constant ($h$).

Referring to the principal elements of the illustrative embodiment of FIG. 1, a discharge tube 1 produces an atomic hydrogen beam 2 which is collimated by an annular stop 3 and passes through a state-selecting magnet 4 which focuses certain atoms onto an aperture 5' in a specially coated dielectric bulb 5, for example a quartz bulb lined with paraffin. The bulb 5 is located in a region of constant-phase axial R.F. magnetic field at the center of a cylindrical microwave cavity 6, operating in the TE$_{011}$ mode and tuned to the hyperfine transition frequency of hydrogen, approximately 1420.405 mc. The atoms make more than $10^4$ random collisions with the coated bulb surface, without serious hyperfine perturbation, and leave the bulb through aperture 5'. When the power delivered to the cavity by the beam equals that lost by the cavity, self-sustained maser oscillation at the hyperfine transition frequency is established.

Atoms of hydrogen consist of a massive nucleus and a single orbital electron, each having a certain magnetic dipole moment. According to quantum mechanics, the dipole moment of the electron in its ground state can assume only two orientations with respect to the nuclear dipole moment, giving rise to two different hyperfine states, $F=0$ and $F=1$, separated in frequency units by approximately 1420.405 megacycles as shown in FIG. 2. When an external magnetic field B is applied, these states split into different $m$ levels corresponding to the various possible orientations of the entire atom with respect to the field. The state-selecting magnet 4, comprising six circumferentially spaced electromagnet pole pieces 9 radially projecting from a common cylindrical yoke 10 and energized by D.C. windings 9' with alternating N and S magnetic polarity, establishes a static magnetic field across beam tube 11 which varies in magnitude as the square of the radical distance from the beam axis. A six-pole permanent magnet has also been used. As can be seen from the slope of the different curves in FIG. 2, atoms in the $F=1$, $m=1$ (1, 1) and $F=1$, $m=0$ (1, 0) states experience an energy gradient forcing these atoms toward the region of low field so that they converge along the beam axis near bulb 5, whereas atoms in the $F=1$, $m=-1$ (1, −1) and $F=0$, $m=0$ (0, 0) states experience an energy gradient of opposite sign and are deflected radially outward. Bulb 5 is provided with an axial tubular extension 11 which permits only well collimated atoms to pass freely therethrough whereby the bulb 5 is predominantly populated with focused (1, 0) and (1, 1) atoms which may radiate by undergoing hyperfine transitions to the (0, 0) state, said radiation establishing self-sustained oscillations in cavity 6 which energize output coaxial coupler 6'.

For frequency standard applications, transition A between the (1, 0) and (0, 0) levels is of particular importance since the frequency of this transition is essentially independent of low intensity environmental magnetic fields, the curves corresponding to these levels approaching the zero field axis with zero slope. In order to enhance this transition, the cavity is enclosed in a magnetic shield (not shown) and a small intensity residual static field (on the order of 5 milligauss or less), directed along the beam axis, is established by D.C. current coils 12.

Also disposed in the vicinity of the bulb 5 is an A.C. coil 13 for producing an alternating magnetic field at right angles to the beam axis to thereby induce lower frequency, field-dependent (1.4 mc./gauss) Zeeman transitions B between the various $m$ levels of the $F=1$ hyperfine state. As the frequency of coil 13 passes through the Zeeman transition frequency, the intensity of the hyperfine maser output 6' is decreased because the mean lifetime of atoms in the $F=1$, $m=0$ level is reduced due to their making transitions to the other $F=1$ levels. By techniques well known in the gyromagnetic resonance art, this intensity degradation signal may be used to measure and/or control the static magnetic field at bulb 5 to a high accuracy. Furthermore, this Zeeman resonance may be used to amplitude modulate information on the microwave output.

In order to obtain maser radiation at the field-dependent (1, 1) to (0, 0) hyperfine transition frequency C, the D.C. coil 12 is rotated 90° so that the residual static magnetic field is at right angles to the beam. The frequency information of the output signal 6' may then be used for field measurement and/or control. Furthermore, the microwave output frequency may be varied, or information frequency modulated onto the output, by varying the static field of the rotated coil 12.

By operating the device below the threshold requirements for oscillation, for example, by lowering the beam power, loading the cavity, or shortening the mean time of atoms in the bulb with a larger entrance aperture 5', the apparatus may function as a narrow band amplifier by the introduction of a hyperfine frequency signal at coupling 6', or at a second coupling (not shown), which signal is used to trigger the maser radiation. Also, pulsed operation may be effected by introducing a hyperfine frequency R.F. input pulse of the proper duration ($t$ seconds) and peak amplitude ($H_1$ gauss) for putting the system in a coherent superposition of the (1, 0) and (0, 0) states, according to the approximate formula $H_1 t = \pi/2.8 \times 10^6$, so that the atoms will continue to radiate after the R.F. pulse has been turned off yielding an induced emission signal whose amplitude decays with a time constant equal to the mean time of the atoms in the bulb. By alternately pulsing the cavity with R.F. and obtaining induced emission signals, the atoms which are in the cavity for a time which is greater than the mean time are subject to more than one R.F. pulse. The mean interaction time of these atoms is then longer than the mean time in the cavity and is characterized by the total time between the pulses they experience. If the pulse intensity is reduced so that it takes two pulses to put an atom in a state of maximum radiation, then the resonance line has a width characteristic of the pulse repetition frequency, which can be made several times smaller than the natural line width in the bulb.

To prevent hyperfine relaxation due to wall collisions, the bulb 5 is coated with a material which is characterized by both a low average atomic polarizability, as contrasted with the high atomic polarizability of cesium, and chemical inertness to hydrogen. The preferred compounds meeting these requirements are the hydrogen-saturated hydrocarbons, the hydrogen-saturated silicones, the silanes, and halogen-saturated compounds such as Teflon (polytetrafluoroethylene). In preliminary experiments, successful operation was obtained with bulbs coated with Paraflint, a high melting point mixture of long straight-chained paraffin hydrocarbon molecules in which the number of carbon atoms per molecule varies from about 40 to 60, with bulbs coated with Dri-Film, a water resistant material of dichloromethyl silane and/or methyltrichloro silane, and with bulbs coated with Teflon, a fluorine-saturated material.

Referring now to additional details in the illustrative embodiment of FIG. 1, the discharge tube 1 comprises water cooled aluminum electrodes 14 sealed through the ends of a Pyrex U-tube 15 cooled by water circulating jacket 16. A thin quartz disc 17 with a .030" diameter hole is waxed to a ground seal at the U-bend to form the source aperture. The total length of the tube 15 is 30" so that the electrode regions are well separated, whereby in the vicinity of the source aperture dissociation takes place with respect to molecular hydrogen which is fed to the discharge tube at inlet 18 through a calibrated leak valve to maintain a stable discharge at a pressure of several tenths of a millimeter Hg. The tube and jacket assembly is mounted on a bellows arrangement 19, and can be aligned by means of two micrometer screws. The discharge is run at about 4 kv., D.C. or A.C., and draws a current of approximately 150 ma.

The focusing magnet 4 is 12" long with a ½" gap having maximum field of about 5500 gauss. The effective solid angle of this magnet for atoms in the (1, 0) state to be focused into a bulb opening 5' of .080" is $6 \times 10^{-5}$ steradians.

The bulb 5 is sealed at flange 20 to form part of the vacuum envelope, and is made of fused quartz so as to be capable of withstanding atmospheric pressure and also have a low microwave loss factor which does not degrade the Q of cavity 6. In the preliminary experiments, the bulbs were 1 mm. thick and ranged in diameter from 3 to 6 inches, with apertures of from 1 to 9 mm. The bulb is supported by diametrically-opposed, collinear tubes 11 and 11'. The collimating tube 11 is about 4" long and is provided with a sealing disc 21 having a small hole which forms the aperture 5'. The tube 11' is completely sealed off next to the bulb 5.

The cylindrical cavity 6 is made of fused quartz with the inside surface silverplated, and has an unloaded Q in excess of 40,000. It is tuned by means of tuning screw 22 threaded through end flange 23 and secured to movable cavity end plate 24. Flanges 20 and 23, and the stiffener rods 25 joining them, are made of a material having a smaller coefficient of thermal expansion than that of tuning screw 22, whereby the cavity tuning is temperature compensated.

The vacuum system is completed by 4" diameter sealed housing tubes 27 and 28 communicating through the magnet tube 11. The collimating stop 3 is sealed to tube 27 at a distance of 3" from the entrance to tube 11 for a stop opening diameter of 3/16". The focusing distance from the exit of tube 11 to the bulb aperture 5' is 50". The system is evacuated and the expended hydrogen continuously removed by means of a vacuum pump and cold trap communicating with each housing member 27 and 28 through ports 27' and 28', respectively. With the beam off, the pressure in the beam tube chamber housed by tube 28 is about $3 \times 10^{-8}$ mm. Hg; and with the beam on, the beam chamber pressure rises to about $2 \times 10^{-7}$ mm. Hg, and the pressure in the source chamber housed by tube 27 rises to about $2 \times 10^{-5}$ mm. Hg.

The radiated power from the illustrative embodiment is typically $5 \times 10^{-12}$ watts, corresponding to a flux of atoms in the (1, 0) state into the cavity of approximately $3 \times 10^{13}$ particles per second. The minimum beam flux needed for oscillation is approximately $4 \times 10^{-12}$ particles per second.

Optical pumping is a possible alternative state-selecting mechanism which would enable the apparatus to be made more compact by elimination of the focusing magnet and/or beam source. For example, the atoms may be irradiated with either polarized or suitably filtered hydrogen spectral radiation which induces optical transitions between the ground state and first excited P state, the net result of the absorption and re-emission of optical photons by the irradiated atoms being to populate $F=1$ states at the expense of the $F=0$ state.

The present invention also comprehends the use of the heavier isotopes of hydrogen as well as the ordinary isotope of atomic mass one. In fact, by the use of these heavier isotopes the second order Doppler shift, which depends on the mean square velocity within the coated storage bulb, may be significantly reduced.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Magnetic resonance apparatus comprising, means for producing an assemblage of gaseous atoms in an upper hyperfine energy state from which said atoms may undergo hyperfine magnetic dipole transitions to a lower hyperfine energy state by radiating energy at said hyperfine transition frequency, means for supporting a radio frequency magnetic field at the frequency of said hyperfine transitions, a walled confining means for confining said atoms in said radio frequency field for interaction with said radio frequency field, said confining means being evacuated to a pressure below 0.01 mm. Hg to produce a sufficiently long mean free path for said atoms between gas to gas collisions within said confining means so that the dominant confining mechanism for said atoms is one of multiple wall collisions, said confining means being dimensioned to retain said atoms within said confining means for a time in excess of that required for 200 successive wall collisions of an atom, said confining means having a wall surface against which said atoms repeatedly collide during confinement, and said wall surface having an average atomic polarizability which is less than half the polarizability of cesium and which surface is chemically inert to said atoms, and said gaseous atoms having a polarizability that is less than half of the polarizability of cesium whereby said radiating atoms maintain substantial phase coherence of the hyperfine radiated energy for substantially in excess of 200 successive collisions of an atom with said surface.

2. The apparatus according to claim 1 wherein said wall surface having low average atomic polarizability is composed of material of the group consisting of hydrogen saturated hydrocarbons, hydrogen saturated silicones, silanes and halogen saturated compounds.

3. Magnetic dipole maser oscillator apparatus comprising, means for producing an ensemble of gaseous atoms in an upper hyperfine energy state whereby said atoms may undergo hyperfine magnetic dipole transitions to a lower hyperfine energy state by radiating energy at said hyperfine transition frequency, said gaseous atoms having a polarizability that is less than half of the polarizability of cesium, means for supporting a radio frequency magnetic field at the frequency of said hyperfine transitions, walled confining means for confining said atoms in said radio frequency field for interaction with said radio frequency field, said confining means being evacuated to a pressure below 0.01 mm. Hg to produce a sufficiently long mean free path for said atoms between gas to gas collisions within said confining means such that the dominant confining mechanism for said atoms is multiple wall collisions, said confining means having a wall surface against which said atoms repeatedly collide during confinement, and said wall surface having a low polarizability which is characterized by an average atomic polarizability substantially less than the polarizability of cesium and which surface is chemically inert to said atoms whereby said radiating atoms maintain substantial phase coherence of the hyperfine radiated energy for substantially in excess of 200 successive collisions of an atom with said surface, and said confining means dimensioned to retain a sufficient number of said atoms within said confining means for a sufficiently long time to produce self-sustaining coherent emission of radiation of said atoms at said hyperfine transition frequency.

4. The apparatus according to claim 3 wherein said wall surface having low average atomic polarizability is composed of material selected from the group consisting of hydrogen saturated hydrocarbons, hydrogen saturated silicones, the silanes, and halogen saturated compounds.

5. Apparatus according to claim 3 further including means for inducing resonance transitions between the $m$ levels of atoms in said upper hyperfine state.

6. Apparatus according to claim 3 further including means for establishing a low intensity static magnetic field in the region of interaction between said atoms and said radio frequency field.

7. Magnetic dipole maser oscillator apparatus comprising, means for forming a beam of hydrogen atoms, means for predominately populating said beam with atoms in an upper hyperfine energy state, a cavity resonator within which said atoms radiate energy at a radio frequency by undergoing transitions to a lower hyperfine state, said resonator being tuned to the radio frequency of said transitions, walled confining means for confining said atoms for interaction with said radio frequency field, said confining means being evacuated to a pressure below 0.01 mm. Hg to produce a characteristic mean free path of said atoms between gas to gas collisions within said confining means which is sufficiently long so that the dominant confining mechanism for said atoms is a multitude of wall collisions, said confining means having a wall surface against which said atoms repeatedly collide during confinement, said wall surface having an average atomic polarizability which is less than half of that of atomic cesium and is chemically inert to hydrogen atoms whereby said radiating hydrogen atoms maintain substantial phase coherence of the hyperfine radiated energy for substantially in excess of 200 successive collisions with said surface, and said confining means being dimensioned to retain a sufficient number of said hydrogen atoms within said confining means for a sufficiently long time to produce self-sustained coherent emission of radiation of said hydrogen atoms at said hyperfine transition frequency, and means for coupling energy from said cavity resonator at said hyperfine transition frequency.

8. Apparatus according to claim 7 wherein said means for predominately populating said beam with atoms in an upper hyperfine state includes means establishing a radially increasing static magnetic field across said beam for axially focusing upper hyperfine state atoms and defocusing lower hyperfine state atoms.

9. Apparatus according to claim 7 wherein said atom confining means consists of a dielectric container disposed centrally of said cavity resonator in a region of substantially constant phase of the radio frequency field and which receives said beam, said container being coated on the interior thereof with a material forming said low polarizability surface, and having a small aperture through which the atoms enter and then leave after undergoing in excess of 1000 collisions with the coated interior thereof.

10. Apparatus according to claim 9 including a tube extending outwardly from said aperture for permitting only collimated atoms to enter said container.

References Cited by the Examiner

UNITED STATES PATENTS 2,948,861   8/1960   Babb _____ 330—4

OTHER REFERENCES

"Advances in Quantum Electronics," edited by Singer, Columbia University Press, New York, 1961 (conference held in March 1961), pages 120–127, article by Alley; and pp. 543–547, article by Kleppner.

Bouchiat et al.: "Physical Review Letters," Oct. 15, 1960, pp. 373–375.

"Quantum Electronics—Paris 1963 Conference," edited by Grivet et al., Columbia University Press, 1964, pp. 333–347, by Ramsey, relied on.

Ramsey: "Review of Scientific Instruments," January 1957, pp. 57–58.

ROY LAKE, *Primary Examiner.*

D. R. HOSTETTER, *Assistant Examiner.*